(No Model.)　　　　　　　　　　　　　　　　　2 Sheets—Sheet 1.

H. P. DAVIS.
RHEOSTAT.

No. 559,685.　　　　　　　　　　　Patented May 5, 1896.

WITNESSES:　　　　　　　　　　　　INVENTOR
Ethan Dodds　　　　　　　　　　　　Harry P. Davis
Hubert C. Tener　　　　　　　　　　BY
　　　　　　　　　　　　　　Terry, MacKaye & Caus
　　　　　　　　　　　　　　　　ATTORNEYS.

(No Model.)  2 Sheets—Sheet 2.
H. P. DAVIS.
RHEOSTAT.
No. 559,685.  Patented May 5, 1896.
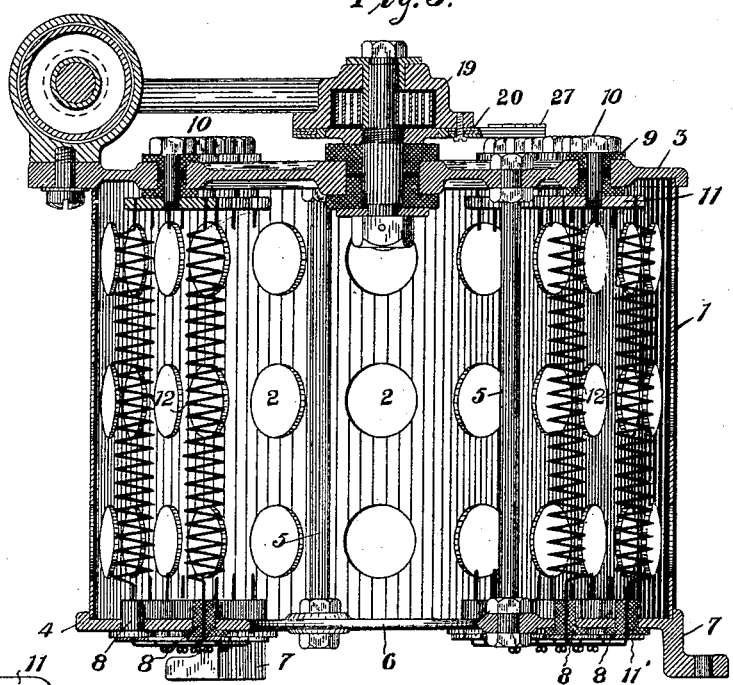
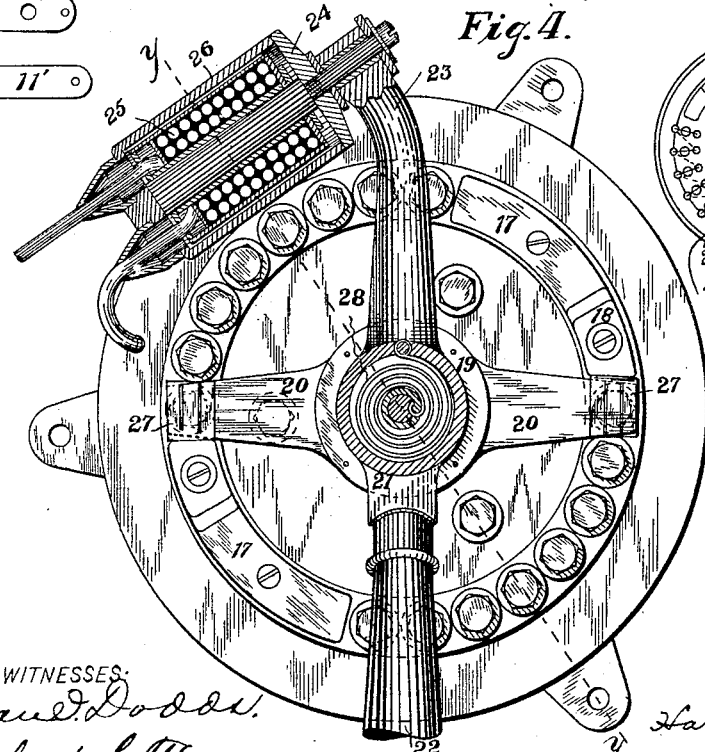
WITNESSES:
INVENTOR
Harry P. Davis
BY
Terry, MacKay Hau
ATTORNEYS.

UNITED STATES PATENT OFFICE.

HARRY P. DAVIS, OF PITTSBURG, PENNSYLVANIA, ASSIGNOR TO THE WESTINGHOUSE ELECTRIC AND MANUFACTURING COMPANY, OF SAME PLACE.

RHEOSTAT.

SPECIFICATION forming part of Letters Patent No. 559,685, dated May 5, 1896.

Application filed July 10, 1895. Serial No. 555,561. (No model.)

*To all whom it may concern:*

Be it known that I, HARRY P. DAVIS, a citizen of the United States, and a resident of Pittsburg, in the county of Allegheny and State of Pennsylvania, have invented a new and useful Improvement in Rheostats, (Case No. 652,) of which the following is a specification.

My invention relates to resistance-boxes or rheostats; and it has for its object to provide a device of this class which shall be simple in construction and which shall have a minimum number of parts as compactly arranged as is consistent with proper ventilation and satisfactory operation.

A further object of the invention is to produce a rheostat in which the movable contacts are normally held in such position by an electromagnetic device that the resistances are inactive and in which the resistances will be first automatically and progressively cut into the main circuit and the latter then opened upon failure of the electromagnetic device to act.

With these objects in view I have devised the apparatus shown in the accompanying drawings, in which—

Figure 1:
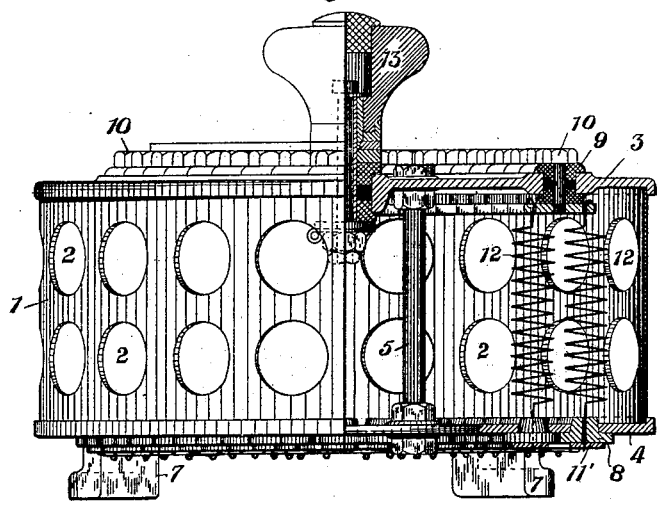
Figure 2:
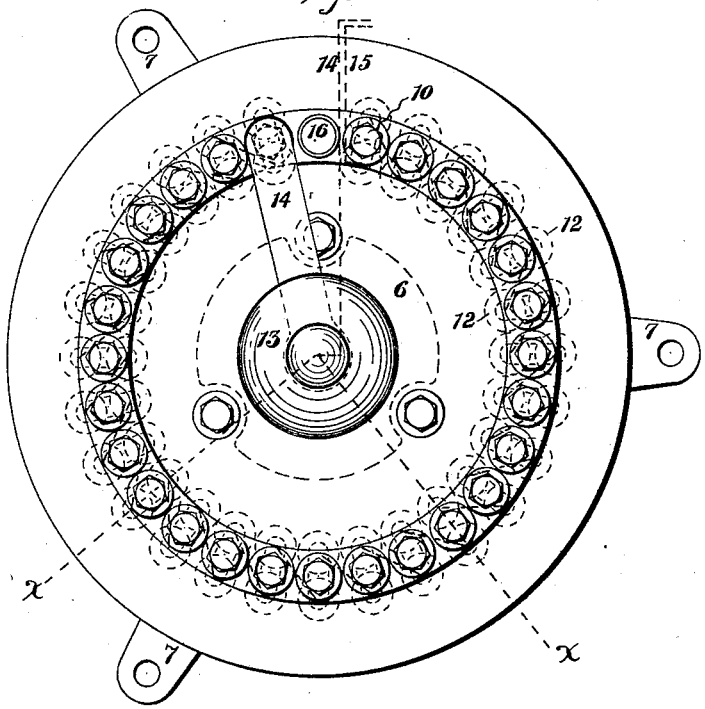

Figure 1 is a side elevation of one form of my invention shown partially in section, as indicated by the line *x x* in Fig. 2. Fig. 2 is a plan view of the rheostat shown in Fig. 1. Fig. 3 is a vertical section of a modified form of the invention, taken on line *y y* of Fig. 4. Fig. 4 is a plan view of the rheostat shown in Fig. 1, the electromagnet and part of the movable contact device being shown in horizontal section and part of the movable contact-handle being broken away. Fig. 5 is a diagram showing the circuits of the rheostat shown in Figs. 3 and 4; and Figs. 6 and 7 are detail views, respectively, of the upper and lower connecting-plates for the resistance-coils.

Referring now to the drawings, particular reference being had to Figs. 1, 2, 6, and 7, the box or casing comprises the cylindrical portion 1, provided with ventilated openings 2, the top 3, and bottom 4, the part 1 being clamped between the parts 3 and 4 by bolts 5. The bottom 4 is provided with a central opening 6 for the purpose of promoting ventilation and with perforated standards or supports 7. The bottom plate 4 is also provided with two concentrically-arranged sets of openings, in which fit insulating-plugs 8. The top plate 3 is provided with a single series of openings, in which are fitted insulating-plugs 9. Each of the insulating-plugs 9 is provided with a cylindrical opening, through which passes the stem of a stationary contact 10, the inner end of the stem being screw-threaded and engaging with a correspondingly-screw-threaded perforation in a conducting-plate 11. The plug 9 is made in two parts, as shown, and the construction of the contact device 10 is such as to clamp the plate 11 rigidly against the lower part of the insulating-plug and the two parts of the plug against the corresponding sides of the top plate 3, thus making a rigid compact connection.

12 are the resistances, constructed of some high-resistance metal, such as German silver, and made in the form of coiled springs, the upper ends extending through the end perforations in the plates 11, the lower ends projecting through perforations in the insulating-plugs 8 and also through perforations in the ends of connecting-plates 11', the latter being held to the bottoms of the insulating-plugs by means of these resistance-coils. The plates 11 connect each pair of resistance-coils located in the same radial plane, and the plates 11' extend diagonally, so as to connect the outer coil of one radial pair with the inner coil of the next radial pair, as indicated by broken lines in Fig. 2, the entire set of coils being thus connected in series, as will be readily seen.

Mounted in the center of the upper plate 3 of the box is a handle 13, which carries a contact-arm 14, the outer end of this contact-arm engaging with the bolt-heads 10 constituting the stationary contacts. The circuit-connections are shown by the broken lines 14 and 15 in Fig. 2. 16 is a stop for the arm 14, constructed of some suitable insulating material.

It will be readily understood from the drawings and foregoing description that when one terminal of the circuit in which the rheostat is to be connected is electrically connected with the contact-arm 14, the latter being in the position shown in Fig. 2, all of the resistance-coils are connected in series with the circuit, and that, as the contact-arm is moved toward the left, the resistances will gradually be cut out until the arm is brought into engagement with the last stationary contact in the series, when none of them will be in circuit.

Referring now more particularly to Figs. 3, 4, and 5, the box or casing has substantially the same structure as in the form of the invention shown in Figs. 1 and 2, except that the openings for the insulating-plugs do not extend entirely around the top and bottom plates, as in the said other form, but are in two sets, each occupying slightly more than a fourth of the circumference. The insulating-plugs 8 and 9, the individual stationary contacts 10, the connecting-plates 11 and 11', and the resistance coils or springs 12 are also the same as the corresponding elements shown in Figs. 1 and 2. A curved plate of insulating material 17, having a stop-lug 18 also formed of insulating material, and either integral with it or bolted to it, is fastened to the top 3 of the box at each side between the end stationary contacts.

Pivoted centrally to the cover 3 and suitably insulated therefrom is a hollow head 19, having rigidly attached thereto contact-arms 20, extending in opposite directions, so as to engage, respectively, with the stationary contacts 10 and constituting electrically a single arm. Extending from this head 19 at right angles to the arms 20 is a socket 21, in which fits a handle 22, and from the opposite side of the head extends in a horizontal direction an arm 23, to the outer end of which is bolted an armature 24. Supported at the outer edge of the top 3 and fastened thereto by suitable means is an electromagnet 25, inclosed in a suitable casing 26, as shown. The position of this magnet is such that when the armature 24 is held in engagement therewith by virtue of the current traversing its coil the ends of the arms 20 are held between the switch-jaws 27, located at the sides of the stop-lugs 18 opposite the part 17. Located in the head 19 is a coiled spring 28, one end of which is fastened to the head and the other end to its stationary bearing, so that when the circuit through the magnet 25 is broken the spring will move the contact-arms 20 quickly over the stationary contacts 10 onto the insulating-pieces 17 and against the lugs 18. The circuits of this form of the invention are shown in Fig. 5.

Assuming that the apparatus is used in connection with the starting and stopping of electric motors and that the current for the armature-circuit of the motor enters at $a$ and the current for the motor field-magnet enters at $b$, it will be seen that with the double contact-arm in the position shown in Fig. 4 of the drawings and in broken lines in Fig. 5, that being the position which it occupies when there is current flowing through the coil of the magnet 25, the circuit will be from point $a$ through the arm 20 and out at $c$, all of the resistances being cut out of circuit. If the field-magnet circuit of the motor should be interrupted for any reason the armature 24 would be released, and the spring would throw the arms 20 back over the stationary contacts approximately to the position shown in full lines in Fig. 5, thus cutting the resistances gradually into circuit until they are all included, and then breaking the circuit completely as the ends of the arms 20 pass onto the insulating-pieces 17.

I claim as my invention—

1. A rheostat comprising a box, circumferentially-arranged resistance-coils in said box and projecting at their lower ends through the bottom thereof, two sets of plates mechanically and electrically connecting said coils in series, one of said sets of plates being inside of the box at the top and the other set being outside at the bottom, and a set of contacts projecting through the top of the box and respectively joined to the adjacent connecting-plates.

2. A rheostat comprising a plurality of sets of resistance-coils arranged concentrically, two sets of metal plates respectively connected to the opposite ends of said coils whereby said coils are joined in series, and a set of contacts directly attached to and supporting one set of said plates, substantially as described.

3. A rheostat comprising a perforated box, a plurality of sets of concentrically-arranged resistance-coils therein, one set of plates on the outer side of the bottom and another set on the inner side of the top of the box, the two sets serving to connect all of the resistance-coils in series, a set of stationary contacts on the outer side of the top or cover and having stems which extend through the cover and are fastened to the upper set of connecting-plates, and a movable arm for engaging said stationary contacts, substantially as described.

4. A rheostat comprising a box having ventilating-openings, two double sets of resistance-coils in said box, and plates connecting the coils of each set in series, two sets of stationary contacts located upon the top of the box and having stems which extend therethrough and are directly joined to the upper connecting-plates, a movable contact device having two electrically-connected contact-arms and an armature, a spring for moving said device in one direction, and an electromagnet acting in opposition to said spring, substantially as described.

5. The combination with two sets of stationary contacts, two double sets of resistance-coils, and plates forming direct electrical and mechanical connection between the coils and contacts, of a movable contact-arm engaging both sets of stationary contacts, an armature rigidly connected to said contact-arm, a spring acting to move said arm in one direction and an electromagnet coöperating with said armature, substantially as described.

6. The combination with a box having two double sets of resistance-coils therein, those of each set being connected in series by top and bottom metal plates, and bolts extending through the top of the box and engaging said plates, the heads of said bolts constituting stationary contacts, of a movable contact-arm for engaging said stationary contacts and connecting more or less of said resistances in series, an electromagnet for holding the movable contact-arm in the no-resistance position, and a spring for moving the arm to progressively cut in the resistances and break the circuit, when the current through the magnet is interrupted, substantially as described.

7. In a rheostat, the combination with a box having two double sets of resistance-coils therein, a set of connecting-plates for each end of each set of coils and stationary contacts extending through the box-cover and engaging directly with the upper sets of plates, of a movable contact device comprising a double contact-arm and a handle and armature, an electromagnet coöperating with said armature, when energized, to retain said contact-arm in position to short-circuit the resistance-coils, and a spring for reversing the contact-arm when the electromagnet-circuit is broken, substantially as described.

In testimony whereof I have hereunto subscribed my name this 2d day of July, A. D. 1895.

HARRY P. DAVIS.

Witnesses:
    ALEXANDER JAY WURTS,
    JAMES B. YOUNG.